(12) United States Patent
Li

(10) Patent No.: US 11,293,585 B2
(45) Date of Patent: Apr. 5, 2022

(54) PEDESTAL, COMPLETE MACHINE DEVICE AND METHOD FOR ASSEMBLING THE SAME

(71) Applicants: HEFEI BOE DISPLAY LIGHTING CO., LTD., Anhui (CN); BOE TECHNOLOGY GROUP CO., LTD., Beijing (CN)

(72) Inventor: Yeyong Li, Beijing (CN)

(73) Assignees: HEFEI BOE DISPLAY LIGHTING CO., LTD., Anhui (CN); BOE TECHNOLOGY GROUP CO., LTD., Beijing (CN)

( * ) Notice: Subject to any disclaimer, the term of this patent is extended or adjusted under 35 U.S.C. 154(b) by 360 days.

(21) Appl. No.: 16/490,224

(22) PCT Filed: Apr. 28, 2019

(86) PCT No.: PCT/CN2019/084854
§ 371 (c)(1),
(2) Date: Aug. 30, 2019

(87) PCT Pub. No.: WO2019/214481
PCT Pub. Date: Nov. 14, 2019

(65) Prior Publication Data
US 2021/0364124 A1    Nov. 25, 2021

(30) Foreign Application Priority Data

May 9, 2018   (CN) .......................... 201820686909.0

(51) Int. Cl.
*F16M 11/00*   (2006.01)
*F16M 11/16*   (2006.01)
(Continued)

(52) U.S. Cl.
CPC ............. *F16M 11/16* (2013.01); *A47B 97/00* (2013.01); *F16M 11/22* (2013.01); *A47B 2097/006* (2013.01)

(58) Field of Classification Search
CPC ......... F16M 11/16; F16M 11/22; A47B 97/00
See application file for complete search history.

(56) References Cited

U.S. PATENT DOCUMENTS 5,887,836 A * 3/1999 Back ....................... B63C 11/18
                                                         248/221.11
7,722,003 B2   5/2010 Ishizaki et al.
(Continued)

FOREIGN PATENT DOCUMENTS

CN     204083693 U    1/2015
CN     204704566 U   10/2015
(Continued)

*Primary Examiner* — Amy J. Sterling

(57) ABSTRACT

Embodiments of the present disclosure provide a pedestal, a complete machine device, and a method of assembling the same. The pedestal includes: a pedestal bracket, including a bracket and a connecting portion connected to each other, the connecting portion including a first mating member; and a connecting member, including a second mating member, wherein the first mating member is detachably fixed to the second mating member. The first surface of the connecting portion is in contact with the second surface of the connecting member, and both the first surface and the second surface have a first curvature.

20 Claims, 5 Drawing Sheets

(51) Int. Cl.
*A47B 97/00* (2006.01)
*F16M 11/22* (2006.01)

(56) References Cited

U.S. PATENT DOCUMENTS

| | | | |
|---|---|---|---|
| 8,020,821 B2* | 9/2011 | Chen | G06F 1/18 |
| | | | 248/220.22 |
| 9,784,538 B2* | 10/2017 | Sovine | F41J 1/10 |
| 10,591,106 B2* | 3/2020 | Pell | F16M 11/16 |
| 10,927,999 B1* | 2/2021 | Wojcik | F16M 11/16 |
| 2002/0140875 A1* | 10/2002 | Ho | G06F 1/1601 |
| | | | 348/839 |
| 2005/0085123 A1* | 4/2005 | Moscovitch | F16M 11/14 |
| | | | 439/532 |
| 2012/0024804 A1* | 2/2012 | Moscovitch | F16M 11/2014 |
| | | | 211/26 |
| 2013/0206938 A1* | 8/2013 | Clouser | A47B 57/567 |
| | | | 248/219.4 |
| 2015/0034780 A1* | 2/2015 | Petry | F16M 11/28 |
| | | | 248/160 |
| 2015/0289651 A1* | 10/2015 | Floersch | F16M 11/10 |
| | | | 211/26 |
| 2017/0257962 A1* | 9/2017 | Huang | F16M 11/041 |
| 2019/0072229 A1* | 3/2019 | Sherman | F16M 11/16 |

FOREIGN PATENT DOCUMENTS

| | | |
|---|---|---|
| CN | 205383411 U | 7/2016 |
| CN | 208204370 U | 12/2018 |
| JP | 2005178963 A | 7/2005 |

\* cited by examiner

PEDESTAL, COMPLETE MACHINE DEVICE AND METHOD FOR ASSEMBLING THE SAME

TECHNICAL FIELD

The embodiments of the present disclosure relate to a pedestal, a complete machine device, and a method of assembling the same.

BACKGROUND

A pedestal is a device used to fix a television at a certain position. In the prior art, the assembling of the pedestal is to lock the pedestal to the back plate. With the popularization of the large-sized television, such locking assembling is not only inconvenient to assemble, but also complicated to disassemble.

SUMMARY

According to a first aspect of an embodiment of the present disclosure, a pedestal is provided, the pedestal includes a pedestal bracket and a connecting member, the pedestal bracket includes a bracket and a connecting portion that are connected to each other, the connecting portion includes a first mating member, the connecting member includes a second mating member, the first mating member is detachably fixed to the second mating member, a first surface of the connecting portion is in contact with a second surface of the connecting member, and the first surface and the second surface both have a first curvature.

For example, in the pedestal provided by the embodiments of the present disclosure, the first curvature is not zero and the first surface and the second surface are curved surfaces.

For example, in the pedestal provided by the embodiment of the present disclosure, the first mating member comprises protrusion portions formed on two side surfaces of the connecting portion, and the protrusion portions face an outer side of the first mating member, and the side surfaces are adjacent to the first surface; and the second snap-fit member comprises sliding slots formed on opposite two sides of the second surface of the connecting member, and the sliding slots faces an inner side of the connecting member and matches with the protrusion portion.

For example, in the pedestal provided by the embodiment of the present disclosure, a spacing of the protrusion portions on a side adjacent to the pedestal bracket is greater than a spacing of the protrusion portions on a side away from the pedestal bracket.

For example, in the pedestal provided by the embodiment of the present disclosure, on each of side surfaces, the protrusion portion is a protrusion extending continuously along the side surface or comprises a plurality of protrusion segments spaced apart along the side surface.

For example, in the pedestal provided by the embodiment of the present disclosure, the protrusion portion and the connection portion are an integral structure.

For example, in the pedestal provided by the embodiment of the present disclosure, a thickness of the protrusion portion is smaller than a thickness of the first mating member.

For example, in the pedestal provided by the embodiment of the present disclosure, the connecting member comprises a third surface opposite to the first surface, in a cross-section perpendicular to a extending direction of the first mating member, a length of the first surface is greater than a length of the third surface, and a surface of the protrusion portion at one side of the protrusion portion coincides with the first surface, and a surface of the protrusion portion at an other side of the protrusion portion opposite to the surface of the protrusion portion at one side of the protrusion portion is spaced apart from the second surface by a distance.

For example, in the pedestal provided by the embodiment of the present disclosure, the first mating member further comprises a scribed-line protrusion and a correction line protrusion formed on the first surface, the second mating member further comprises a scribed-line groove and a correction line groove formed on the second surface, the scribed-line groove matches the scribed-line protrusion and the correction line groove matches the correction line protrusion; or the first mating member further comprises a scribed-line groove and a correction line groove formed on the first surface, the second mating member further comprises a scribed-line protrusion and a correction line protrusion formed on the second surface, the scribed-line protrusion matches the scribed-line groove and the correction line protrusion matches the correction line groove.

For example, in the pedestal provided by the embodiment of the present disclosure, the scribed-line groove is disposed perpendicular to the correction line groove; and the scribed-line protrusion is disposed perpendicular to the correction line protrusion.

For example, in the pedestal provided by the embodiment of the present disclosure, the first mating member further comprises at least one bump groove disposed on the first surface, and the second mating member further comprises at least one bump which is disposed between the sliding slots and matches the bump groove; or the first mating member further comprises at least one bump disposed on the first surface, and the second mating member further comprises at least one bump groove which is disposed between the sliding slots and matches the bump.

For example, in the pedestal provided by the embodiment of the present disclosure, a surface of the bump is in a rounded structure.

For example, in the pedestal provided by the embodiment of the present disclosure, a fourth surface of the connecting member opposite to the second surface has a second curvature, and the first curvature is smaller than or equal to the second curvature.

For example, in the pedestal provided by the embodiment of the present disclosure, the connecting member is further provided with a fixing screw hole, and the connecting member is connected to the body of the complete machine through the fixing screw hole.

According to a second aspect of an embodiment of the present disclosure, a complete machine device is provided, the complete machine device includes a main body of the complete machine device and the pedestal coupled to the main body of the complete machine device and provided by the first aspect of the embodiments of the present disclosure.

For example, in the complete machine device provided by the embodiment of the present disclosure, the second curvature is matched with a curvature of the main body of the complete machine device, and the connecting member is connected to the main body of the complete machine device through a fixing screw hole.

For example, in the complete machine device provided by the embodiment of the present disclosure, at least two pedestals are connected to the main body of the complete machine device, and the at least two pedestals are respectively disposed at two edge regions of a bottom surface of the main body of the complete machine device.

According to a third aspect of an embodiment of the present disclosure, a method of assembling a complete machine device according to the second aspect is provided, the method includes: fixedly connecting the connecting members of the at least one pedestal to the main body of the complete machine device; and detachably and fixedly connecting the second snap-fit member of the pedestal to the first snap-fit member of the pedestal.

For example, in the method of assembling the complete machine device provided by the embodiment of the present disclosure, the fixedly connecting the connecting members of the at least one pedestal to the main body of the complete machine device comprises: fixedly connecting the connecting members of two pedestals to two sides of a bottom surface of the main body of the complete machine; and detachably and fixedly connecting the second snap-fit members of the two pedestals to the first snap-fit members.

BRIEF DESCRIPTION OF THE DRAWINGS

In order to clearly illustrate the technical solutions of the embodiments of the present disclosure, the drawings to be used in the description of the embodiments of the present disclosure will be briefly described below. It is obvious that the drawings in the following description are only some of the present disclosure. For the embodiments, other drawings may be obtained from those skilled in the art without any inventive labor.

DETAILED DESCRIPTION

Figure 1:
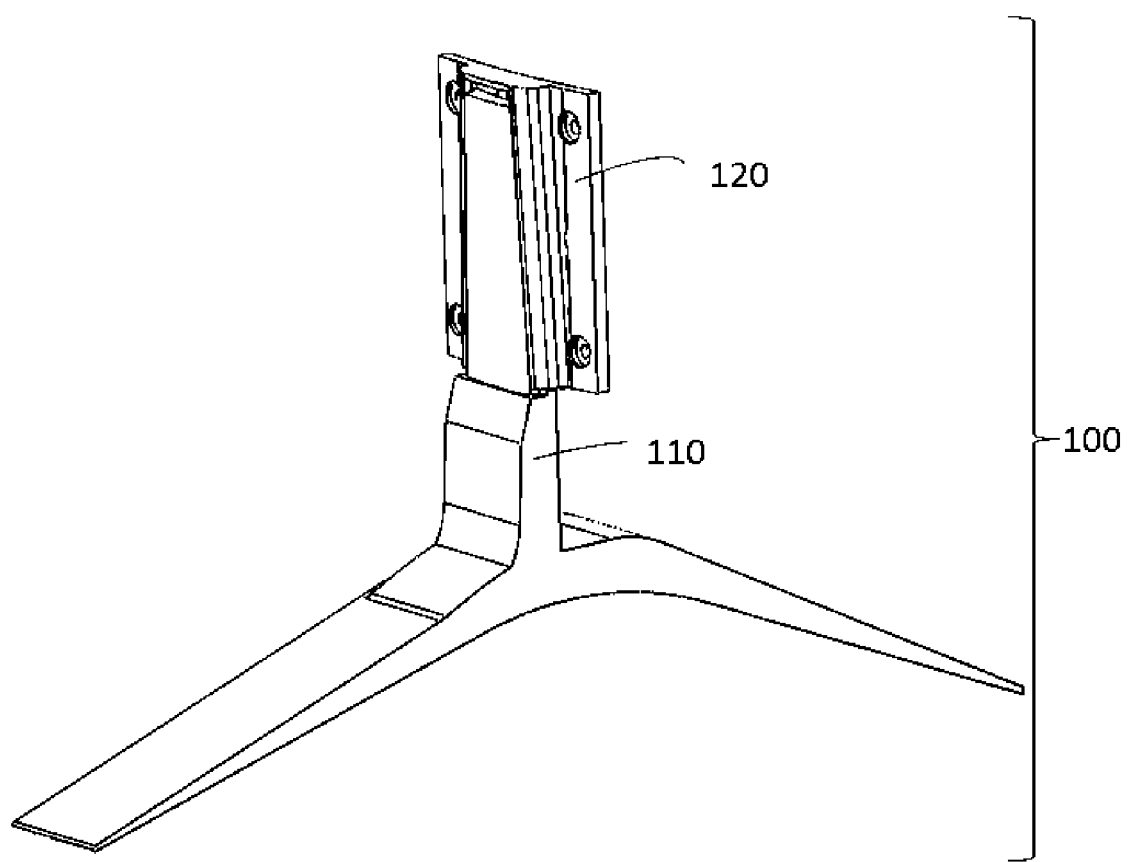
FIG. 1 is a schematic structural diagram of a pedestal provided by an embodiment of the present disclosure.

The embodiments of the present disclosure are described in detail below, and the examples of the embodiments are illustrated in the accompanying drawings, in which the same or similar reference numerals indicate the same or similar elements or elements having the same or similar functions. The embodiments described below with reference to the accompanying drawings are intended to be illustrative only, and are not to be construed as limiting the embodiments of the present disclosure.

In the description of the present specification, the description with reference to the terms "an embodiment", "some embodiments", "examples", "a specific example", or "some examples" and the like means that the specific features, structures, materials or characteristics described in connection with the embodiments or examples are included in at least one embodiment or example of the invention. In the present specification, the schematic representation of the above terms is not necessarily directed to the same embodiment or example. Furthermore, the particular features, structures, materials, or characteristics described may be combined in a suitable manner in any one or more embodiments or examples. In addition, various embodiments or examples described in the specification, as well as features of various embodiments or examples, may be incorporated and combined by those skilled in the art.

Moreover, the terms "first" and "second" are used for descriptive purposes only and are not to be construed as indicating or implying a relative importance or implicitly indicating the number of technical features indicated. Thus, features defining "first" or "second" may include at least one of the features, either explicitly or implicitly. In the description of the present invention, the meaning of "a plurality" is two or more than two, unless it is specifically defined otherwise.

The locking assembling of the pedestal often has the following problems. No locking tools to install screws of the pedestal causes that the pedestal cannot be installed. No tools to lock the screws causes that the pedestal cannot be completely tightened, and it will be loosened after long time use. Losing screws during assembling will result in the situation that the screws are not enough, which might affect use safety. When there is a quality issue in the complete machine, it is complicated to disassembly the pedestal.

A pedestal and a complete machine device provided by an embodiment of the present disclosure are described in detail below by enumerating several specific embodiments.

Referring to FIG. 1, a schematic structural diagram of a pedestal of an embodiment of the present disclosure is illustrated. A pedestal 100 includes a pedestal bracket 110, and a connecting member 120 for connecting with a main body of the complete machine.

Figure 2:
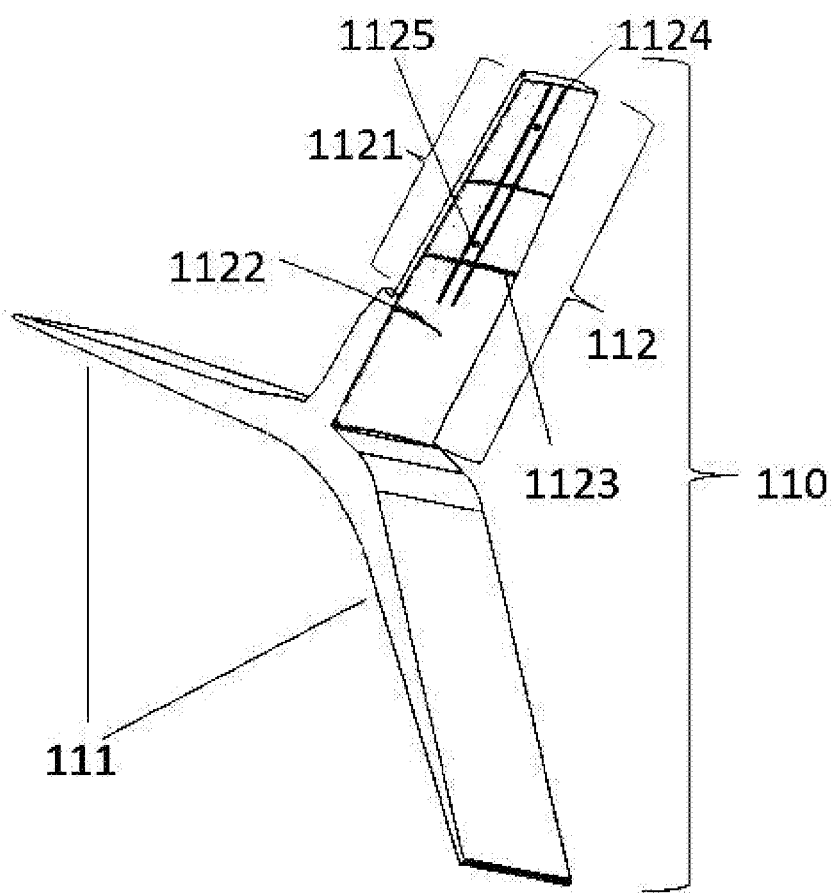
FIG. 2 is a schematic connection diagram of a pedestal bracket provided by an embodiment of the present disclosure.
Figure 3:
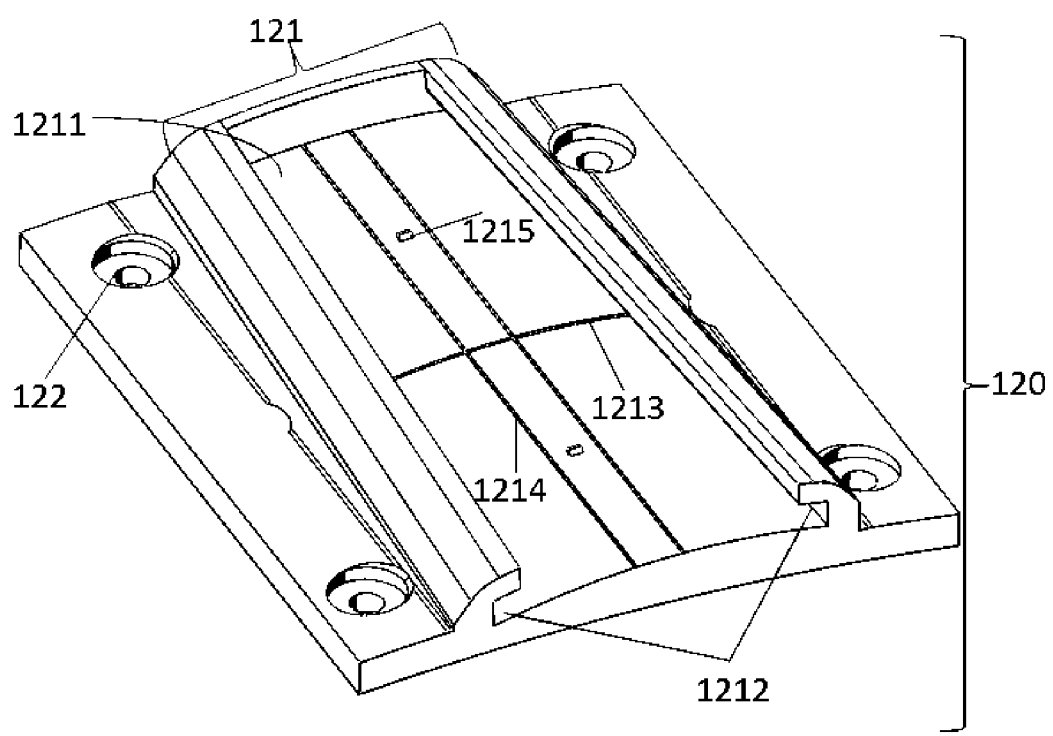
FIG. 3 is a schematic structural diagram of a connecting member provided by an embodiment of the present disclosure.

Referring to FIG. 2, a schematic structural diagram of a pedestal bracket of an embodiment of the present disclosure is illustrated. Referring to FIG. 3, a schematic structural diagram of a connecting member of an embodiment of the present disclosure is illustrated.

The pedestal bracket 110 includes a bracket 111 and a connecting portion 112 that are connected to each other. The connecting portion 112 includes a first mating member 1121, such as a first snap-fit member, and the connecting member 120 includes a second mating member 121, such as a second snap-fit member. The first mating member is detachably fixed to the second mating member. For example, the first snap-fit member 1121 is in a snap-fit connection with the second snap-fit member 121, to achieve the connection between the pedestal bracket 110 and the connecting member 120. A first surface 1122 of the connecting portion 112 is in contact with a second surface 1211 of the connecting member 120, and the first surface 1122 and the second surface 1211 both have a first curvature.

For example, the first curvature is not zero, and the first surface and the second surface are curved surfaces.

The first surface 1122 of the pedestal bracket 110 is in contact with the second surface 1211 of the connecting member 120, and the curvatures of the surfaces are matched to ensure a secure connection between the pedestal bracket and the connecting member.

The first snap-fit member 1121 of the pedestal bracket 110 is in a trapezoidal shape. When the first snap-fit member 1121 is inserted into the second snap-fit member 121, the connecting member 120 can be fixed more firmly due to the gravity downward.

For example, the connecting member 120 may further include portions extending outward from both sides of the second mating member 121, and the portions may be integral with the second mating member 121 or fixedly connected to the second mating member 121.

Figure 4:
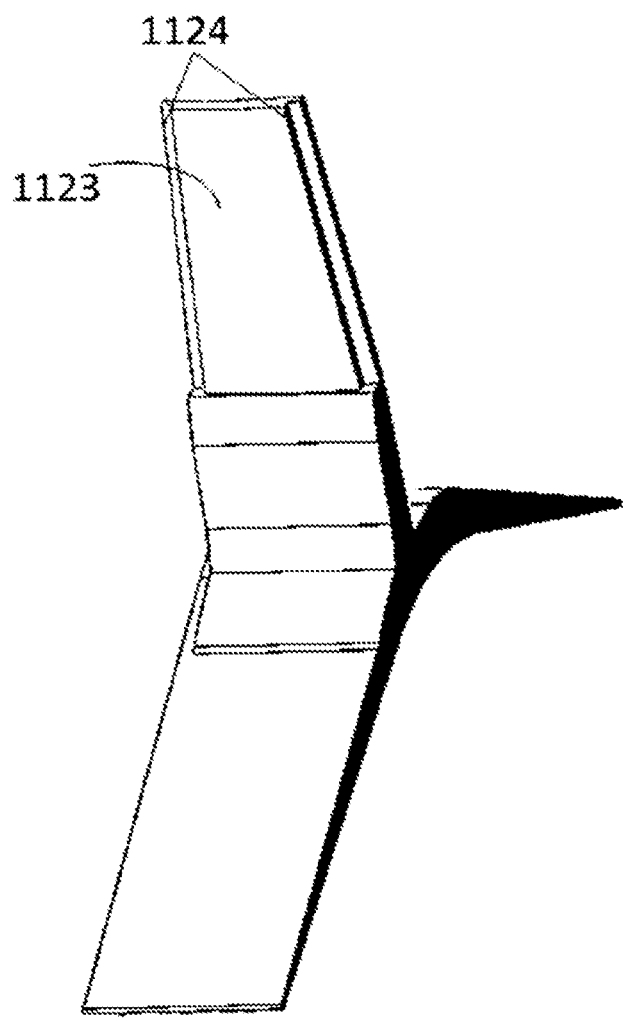
FIG. 4 is a schematic structural diagram of a pedestal bracket provided by an embodiment of the present disclosure.

Referring to FIG. 4, a schematic structural diagram of a pedestal bracket of an embodiment of the present disclosure is illustrated. In an embodiment of the present disclosure, the first mating member 1121 includes a protrusion portion 1124 formed on two side surfaces of the connecting portion. The protrusion portion 1124 faces an outer side of the first mating member 1121, and the two side surfaces are adjacent to the first surface. The second snap-fit member 121 includes sliding slots 1212 formed on two opposite sides on the second surface 1211 of the connecting member, and the sliding slots 1212 are for example engaged with the protrusion portion 1124, for example, the sliding slots 1212 are in a snap-fit connection with the protrusion portion 1124.

For example, on each of the side surfaces, the protrusion portion is a protrusion extending continuously along the side surface or includes a plurality of protrusion segments spaced apart along the side surface. The embodiment of the present disclosure is not limited thereto as long as it can be matched with the sliding slot.

For example, the protrusion portion 1124 is integral with the first mating member 1121.

For example, a thickness of the protrusion portion is smaller than a thickness of the first mating member, and the thickness is a dimension on a direction perpendicular to an extending direction of the first mating member. As can be seen from FIG. 4, a step is formed at the side surface due to the thickness difference.

For example, the connecting portion includes a third surface which is in the back of the first surface and on a cross-section perpendicular to the extending direction of the first mating member, that is, a surface parallel to an upper end surface shown in FIG. 4, a length of the first surface is greater than a length of the third surface. A surface at one side of the protrusion portion coincides with the first surface, and A surface at the other side of the protrusion portion opposite to the surface at the one side is spaced apart from the second surface by a distance. As can be seen from FIG. 4, a surface of the first mating member parallel to the end surface has an inverted T shape, in which the protrusion portions at both ends of the upper portion of the "T" mate with the sliding slots of the second mating member to realize detachable connection of the pedestal bracket and the connecting member. The surface at one side of the protrusion portion coincides with the first surface so as to be in close contact with the second surface to achieve a stable connection.

For example, a surface of the protrusion portion at a side facing the connecting member may not coincide with the first surface. The protrusion portion may be at a position between the first surface and the third surface without any one surface coinciding the first surface and the third surface.

In an embodiment of the present disclosure, a spacing of the protrusion portions 1124 on a side adjacent to the pedestal bracket 110 is greater than a pitch on a side away from the pedestal bracket 110.

In an embodiment of the present disclosure, the first snap-fit member 1121 further includes a scribed-line protrusion 1223 and a correction line protrusion 1224 formed on the first surface 1122. The second snap-fit member 121 further includes a scribed-line groove 1213 and a correction line groove 1214 formed on the second surface 1211, where the scribed-line groove 1213 matches the scribed-line protrusion and the correction line groove 1214 matches the correction line protrusion.

Alternatively, the first mating member further includes a scribed-line groove and a correction line groove formed on the first surface. The second mating member further includes a scribed-line protrusion and a correction line protrusion formed on the second surface, where the scribed-line protrusion matches the scribed-line groove and the correction line protrusion matches the correction line groove.

In an embodiment of the present disclosure, the scribed-line groove 1213 is disposed perpendicular to the correction line groove 1214, and the scribed-line protrusion 1123 is disposed perpendicular to the correction line protrusion 1124.

Figure 5:
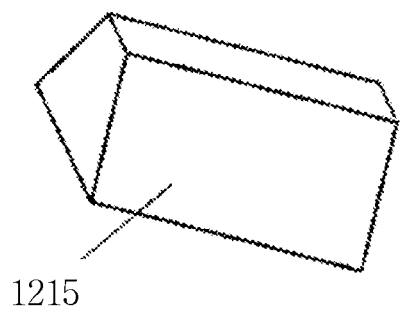
FIG. 5 is a schematic structural diagram of a bump provided by an embodiment of the present disclosure.

In an embodiment of the present disclosure, the first snap-fit member 1121 further includes a bump groove 1125 disposed on the first surface 1122. The second snap-fit member 121 further includes a bump 1215 disposed between the sliding slots 1212 that matches the bump groove 1125. Alternatively, the first mating member further includes at least one bump disposed on the first surface, and the second mating member further includes at least one bump groove disposed between the sliding slots that matches the bump. Referring to FIG. 5, a schematic structural diagram of a bump of an embodiment of the present disclosure is illustrated.

In an embodiment of the present disclosure, a surface of the bump 1215 may have a rounded structure.

For example, the bump groove 1125, the scribed-line protrusion 1123, and the correction line protrusion 1124 on the pedestal bracket 110 respectively matches the bump 1215, the scribed-line groove 1213 and the correction line groove 1214 on the connecting member 120, to prevent the pedestal from falling off. The bump 1215 may have two rounded corners to facilitate the connection and detachment of the pedestal bracket 110 and the connecting member 120. The correction line protrusion 1124 matches the correction line groove 1214 to prevent the pedestal bracket from being mounted to the connecting member in an incorrect direction and to prevent from confusing the right or left assembling direction.

Because of the bump 1215 and the correction line protrusion 1124, the pedestal bracket will not fall off when the complete machine is lifted. The scribed-line protrusion 1124 may also be designed to be rounded so that when the pedestal bracket 110 is pulled out with force, it is guaranteed that the pedestal bracket 110 can be effectively pulled out from the connecting member 120.

In an embodiment of the present disclosure, the number of the bump 1215, the scribed-line protrusion 1123, and the correction line protrusion 1124 are not constant. The number may be set based on actual needs, which is not limited in the embodiments of the present disclosure.

The shape of the bump 1215, the scribed-line protrusion 1123, and the correction line protrusion 1124 may be trapezoidal bodies or other shapes, as long as the pedestal can be prevented from falling off, and the shape is not limited in the embodiments of the present disclosure.

In an embodiment of the present disclosure, a fourth surface 123 (a surface of the connecting member 120 opposite to the second surface 1211, not shown in the figures) of the connecting member 120 contacting the main body of the complete machine 200 has a second curvature matching a curvature of the main body of the complete machine. The first curvature is smaller than or equal to the second curvature, and the fourth surface 123 is in the back of the second surface.

Curvatures of the first surface 1122 of the first snap-fit member 1121 and the second surface 1211 of the connecting member 120 are consistent with the curvature of the complete machine. If contact surfaces of the first surface 1122 and the second surface 1211 are designed to be flat, the pedestal is easily separated from the complete machine when the complete machine is lifted. Therefore, it is necessary to keep the curvatures of the first surface 1122 and the second surface 1211 of the connecting member 120 consistent with the curvature of the complete machine to increase the stability of the assembling.

In an embodiment of the present disclosure, the connecting member 120 may further be provided with a fixing screw hole 122, and the connecting member 120 is connected to the main body of the complete machine 200 through the fixing screw hole 122.

The connecting member 120 and the main body of the complete machine 200 are connected by screws.

Figure 6:
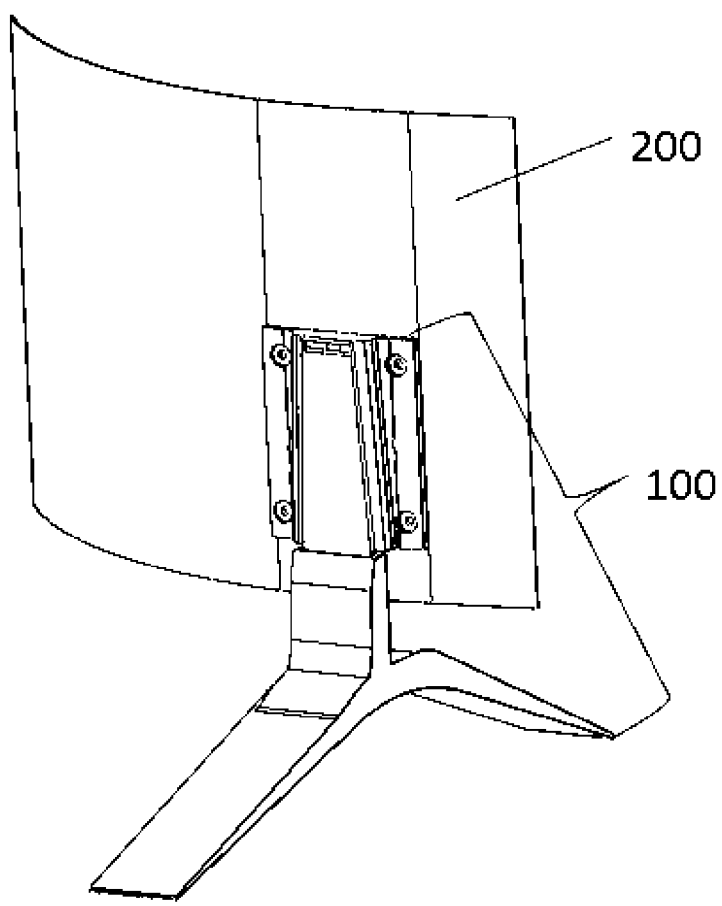
FIG. 6 is a schematic structural diagram of a complete machine device provided by an embodiment of the present disclosure.

An embodiment of the present disclosure further provides a complete machine device. Referring to FIG. 6, a schematic structural diagram of a complete machine device according to an embodiment of the present disclosure is illustrated. The complete machine device includes a main body of the complete machine 200 and a pedestal 100 connected to the main body of the complete machine 200.

For example, one pedestal may be connected to the main body of the complete machine, and a direction of the bracket of the pedestal may extend along a length direction of the main body of the complete machine, or the bracket may be rotatable about the connecting portion.

For example, two pedestals may be disposed to be connected to the main body of the complete machine, and the two pedestals are respectively disposed at two edge regions of a bottom surface of the main body of the complete machine. The bracket of the pedestal may extend perpendicular to the length direction of the main body of the complete machine.

Alternatively, three or more pedestals may be provided, and the three or more pedestals are evenly distributed on the bottom surface of the main body of the complete machine, to increase the stability of the main body of the complete machine.

For example, the complete machine device may be any device that needs to be placed on a certain plane such as a television set, a display, a screen, etc., and it is not limited in the embodiments of the present disclosure.

An embodiment of the present disclosure further provides a method for assembling a complete machine device as described above, includes: fixedly connecting a connecting member of at least one pedestal to a main body of the complete machine; and detachably and fixedly connecting a second mating member of the pedestal to a first mating member of the pedestal.

For example, the fixedly connecting the connecting member of the at least one pedestal to the main body of the complete machine includes: fixedly connecting the connecting members of two pedestals to two sides of a bottom surface of the main body of the complete machine. The detachably and fixedly connecting the second mating member of the pedestal to the first mating member of the pedestal includes: detachably and fixedly connecting the second mating members of the two pedestals to the first mating members of the pedestals.

For a pedestal, a complete machine device and an assembling method thereof provided by embodiments of the present disclosure, the pedestal includes: a pedestal bracket and a connecting member for connecting with a main body of the complete machine. The pedestal bracket includes a bracket and a connecting portion connected to each other.

The connecting portion includes a first mating member, and the connecting member includes a second mating member. The first mating member is detachably fixed to the second mating member to realize the connection between the pedestal bracket and the connecting member. The first surface of the connecting portion is in contact with the second surface of the connecting member, and the first surface and the second surface both have a first curvature. After the connecting member is connected to the main body of the complete machine, the connecting member is detachably connected (e.g. in a snap-fit connection) to the pedestal bracket, so that when a problem occurs in the complete machine, the complete machine can be replaced alone with the connecting member, then the connecting member is directly connected to the pedestal bracket for easy replacement and detachment. Additionally, even if the connecting member is detached from the main body and in a case of no pedestal bracket, it is more convenient to operate. Therefore, the complexity of the lock assembling of the pedestal and the inconvenience to disassemble can be avoided. Moreover, the curvature of the fourth surface of the pedestal matches the curvature of the surface of the main body, thereby making the assembling more stable.

A person skilled in the art is able to clearly understand that for the convenience and brevity of the description, the specific working process of the system, the device and the unit described above can refer to the corresponding process in the foregoing method embodiment, and details are not described herein again.

The above is only a specific implementation of the embodiments of the present disclosure, but the scope of protection of the embodiments of the present disclosure is not limited thereto. Any changes or substitutions that are readily conceivable within the technical scope disclosed by the embodiments of the present disclosure by a person skilled in the art should be covered by the protection scope of the embodiments of the present disclosure. Therefore, the scope of protection of the embodiments of the present disclosure should be determined by the scope of the claims.

For the present disclosure, the following points shall be explained:

(1) The drawings of the embodiments of the present disclosure relate only to the structures related to the embodiments of the present disclosure, and other structures can refer to the general design.

(2) For the sake of clarity, in the drawings for describing embodiments of the present disclosure, the thickness of layers or regions is enlarged or reduced, that is, the drawings are not drawn to actual scales.

(3) In the case of no conflict, the embodiments of the present disclosure and the features in the embodiments may be combined with each other to obtain a new embodiment.

The present application claims the priority of the Chinese Patent Application No. 201820686909.0 filed on May 9, 2018, and the complete disclosure of which is hereby incorporated by reference.

What is claimed is:

1. A pedestal, comprising:
a pedestal bracket, comprising a bracket and a connecting portion connected to each other, and the connecting portion comprising a first mating member; and
a connecting member, comprising a second mating member,
wherein the first mating member is detachably fixed to the second mating member, and a first surface of the connecting portion is in contact with a second surface of the connecting member, and the first surface and the second surface both have a first curvature,
wherein the connecting member is further provided with a fixing screw hole.

2. The pedestal of claim 1, wherein the first curvature is not zero and the first surface and the second surface are curved surfaces.

3. The pedestal of claim 1, wherein the first mating member comprises protrusion portions formed on two side surfaces of the connecting portion, and the protrusion portions face an outer side of the first mating member, and the side surfaces are adjacent to the first surface; and
the second mating member comprises sliding slots formed on opposite two sides of the second surface of the connecting member, and the sliding slots faces an inner side of the connecting member and matches with the protrusion portion.

4. The pedestal of claim 2, wherein a spacing of the protrusion portions on a side adjacent to the pedestal bracket is greater than a spacing of the protrusion portions on a side away from the pedestal bracket.

5. The pedestal of claim 3, wherein on each of side surfaces, the protrusion portion is a protrusion extending continuously along the side surface or comprises a plurality of protrusion segments spaced apart along the side surface.

6. The pedestal of claim 3, wherein the protrusion portion and the connection portion are an integral structure.

7. The pedestal of claim 3, wherein a thickness of the protrusion portion is smaller than a thickness of the first mating member.

8. The pedestal of claim 7, wherein the connecting member comprises a third surface opposite to the first surface, in a cross-section perpendicular to a extending direction of the first mating member, a length of the first surface is greater than a length of the third surface, and a surface of the protrusion portion at one side of the protrusion portion coincides with the first surface, and a surface of the protrusion portion at an other side of the protrusion portion opposite to the surface of the protrusion portion at one side of the protrusion portion is spaced apart from the second surface by a distance.

9. The pedestal of claim 1, wherein
the first mating member further comprises a scribed-line protrusion and a correction line protrusion formed on the first surface, the second mating member further comprises a scribed-line groove and a correction line groove formed on the second surface, the scribed-line groove matches the scribed-line protrusion and the correction line groove matches the correction line protrusion; or
the first mating member further comprises a scribed-line groove and a correction line groove formed on the first surface, the second mating member further comprises a scribed-line protrusion and a correction line protrusion formed on the second surface, the scribed-line protrusion matches the scribed-line groove and the correction line protrusion matches the correction line groove.

10. The pedestal of claim 9, wherein
the scribed-line groove is disposed perpendicular to the correction line groove; and
the scribed-line protrusion is disposed perpendicular to the correction line protrusion.

11. The pedestal of claim 1, wherein
the first mating member further comprises at least one bump groove disposed on the first surface, and the second mating member further comprises at least one bump which is disposed between the sliding slots and matches the bump groove; or
the first mating member further comprises at least one bump disposed on the first surface; and the second mating member further comprises at least one bump groove which is disposed between the sliding slots and matches the bump.

12. The pedestal of claim 11, wherein a surface of the bump is in a rounded structure.

13. The pedestal of claim 1, wherein a fourth surface of the connecting member opposite to the second surface has a second curvature, and the first curvature is smaller than or equal to the second curvature.

14. A complete machine device, comprising:
a main body of the complete machine device; and
at least one pedestal according to claim 1, coupled to the main body of the complete machine device,
wherein the second curvature is matched with a curvature of the main body of the complete machine device, and the connecting member is connected to the main body of the complete machine device through a fixing screw hole.

15. The complete machine device of claim 14, wherein at least two pedestals are connected to the main body of the complete machine device, and the at least two pedestals are respectively disposed at two edge regions of a bottom surface of the main body of the complete machine device.

16. A method of assembling a complete machine device comprising:
providing a main body, of the complete machine device,
providing at least one pedestal, coupling to the main body of the complete machine device, wherein the pedestal comprises:
a pedestal bracket, wherein the pedestal bracket comprises a bracket and a connecting portion connected to each other, and the connecting portion comprises a first mating member; and
a connecting member, comprising a second mating member,
fixedly attaching the connecting members of the at least one pedestal to the main body of the complete machine device; and
detachably and fixedly connecting the second mating member of the pedestal to the first mating member of the pedestal.

17. The method of assembling the complete machine device of claim 16, wherein the fixedly connecting the connecting members of the at least one pedestal to the main body of the complete machine device comprises:
fixedly connecting the connecting members of two pedestals to two sides of a bottom surface of the main body of the complete machine; and
detachably and fixedly connecting the second mating members of the two pedestals to the first mating members.

18. The pedestal of claim 2, wherein
the first mating member further comprises a scribed-line protrusion and a correction line protrusion formed on the first surface, the second mating member further comprises a scribed-line groove and a correction line groove formed on the second surface, the scribed-line groove matches the scribed-line protrusion and the correction line groove matches the correction line protrusion; or
the first mating member further comprises a scribed-line groove and a correction line groove formed on the first surface, the second mating member further comprises a scribed-line protrusion and a correction line protrusion formed on the second surface, the scribed-line protrusion matches the scribed-line groove and the correction line protrusion matches the correction line groove.

19. A pedestal, comprising:
a pedestal bracket, comprising a bracket and a connecting portion connected to each other, and the connecting portion comprising a first mating member; and
a connecting member, comprising a second mating member,
wherein the first mating member is detachably fixed to the second mating member, and a first surface of the connecting portion is in contact with a second surface of the connecting member, and the first surface and the second surface both have a first curvature,
wherein the first curvature is not zero and the first surface and the second surface are curved surfaces,
wherein a spacing of the protrusion portions on a side adjacent to the pedestal bracket is greater than a spacing of the protrusion portions on a side away from the pedestal bracket.

20. The pedestal of claim 19, wherein on each of side surfaces, the protrusion portion is a protrusion extending continuously along the side surface or comprises a plurality of protrusion segments spaced apart along the side surface.

* * * * *